(12) United States Patent
Chung et al.

(10) Patent No.: US 8,764,062 B2
(45) Date of Patent: Jul. 1, 2014

(54) EXTERIOR AIRBAG CUSHION FOR VEHICLE

(71) Applicant: Hyundai Motor Company, Seoul (KR)

(72) Inventors: Tae Wook Chung, Seoul (KR); Yong Sun Kim, Namyangju-si (KR); Seoung Hoon Lee, Suwon-si (KR); Jin Ho Bae, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/714,909

(22) Filed: Dec. 14, 2012

(65) Prior Publication Data

US 2014/0097604 A1    Apr. 10, 2014

(30) Foreign Application Priority Data

Oct. 10, 2012 (KR) ........................ 10-2012-0112349

(51) Int. Cl.
*B60R 19/20* (2006.01)

(52) U.S. Cl.
CPC .................................. *B60R 19/205* (2013.01)
USPC ........... 280/770; 180/271; 180/274; 297/107; 297/110

(58) Field of Classification Search
CPC .................................................... B60R 19/205
USPC ........... 180/770, 271, 274; 280/739; 293/107, 293/110
See application file for complete search history.

(56) References Cited

U.S. PATENT DOCUMENTS

| 5,478,111 | A  | * | 12/1995 | Marchant et al. | 280/739 |
| 5,603,526 | A  | * | 2/1997  | Buchanan | 280/739 |
| 5,646,613 | A  | * | 7/1997  | Cho | 340/903 |
| 5,725,265 | A  | * | 3/1998  | Baber | 293/107 |
| 6,106,038 | A  | * | 8/2000  | Dreher | 293/118 |
| 6,227,325 | B1 | * | 5/2001  | Shah | 180/274 |
| 6,749,218 | B2 | * | 6/2004  | Breed | 280/735 |
| 6,923,483 | B2 | * | 8/2005  | Curry et al. | 293/107 |
| 6,971,671 | B2 | * | 12/2005 | Schneider et al. | 280/739 |
| 7,036,844 | B2 | * | 5/2006  | Hammer et al. | 280/730.1 |
| 7,614,654 | B2 | * | 11/2009 | Williams | 280/743.1 |
| 7,753,159 | B2 | * | 7/2010  | Kim et al. | 180/274 |
| 2002/0005142 | A1 | * | 1/2002 | Demarquilly et al. | 105/392.5 |
| 2007/0057490 | A1 | * | 3/2007 | Deflorimonte | 280/730.1 |
| 2008/0309060 | A1 | * | 12/2008 | Hakki et al. | 280/770 |
| 2010/0059972 | A1 | * | 3/2010 | Kim et al. | 280/728.2 |
| 2013/0048405 | A1 | * | 2/2013 | Okamoto et al. | 180/274 |

FOREIGN PATENT DOCUMENTS

| JP | 8-188112 A | 7/1996 |
| KR | 10-1047561 B1 | 7/2011 |

* cited by examiner

*Primary Examiner* — J. Allen Shriver, II
*Assistant Examiner* — Steve Clemmons
(74) *Attorney, Agent, or Firm* — Morgan, Lewis & Bockius LLP

(57) ABSTRACT

An external airbag cushion including: an outer cover that inflates to cover the front of a bumper of a vehicle; a plurality of separation walls that are disposed inside outer cover to divide the inside into a plurality of chambers in the transverse direction of the vehicle; and low-pressure variable vents and high-pressure variable vents that are disposed for the chambers, respectively, and selectively open, depending on the internal pressure of the chambers.

8 Claims, 3 Drawing Sheets

EXTERIOR AIRBAG CUSHION FOR VEHICLE

CROSS-REFERENCE TO RELATED APPLICATION

The present application claims priority of Korean Patent Application Number 10-2012-0112349 filed Oct. 10, 2012, the entire contents of which application is incorporated herein for all purposes by this reference.

BACKGROUND OF INVENTION

1. Field of Invention

The present invention relates to an external airbag cushion for a vehicle which is deployed forward from a front bumper of the vehicle to absorb shock on impact.

2. Description of Related Art

External airbag are provided in front bumpers of vehicles. Such an exterior airbag is deployed forward when detecting danger of collision, thus protecting the vehicle on impact.

FIG. 1 is an exploded perspective view of an external airbag of the related art and the external airbag is disposed inside a bumper, and in detail, an airbag module on the back beam of the bumper unfolds and inflates outward from the bumper through an unfolding guide.

FIG. 2 is a view showing an external airbag cushion of the related art, which has been developed by the applicant(s), but not published yet, in which a cushion is formed in a box shape and transversely unfolds along the front of the bumper of a vehicle, covering the bumper.

Further, the external airbag has a plurality of chambers separated by separation walls inside and a gas independently flows into the chambers, thereby preventing the entire cushion from bending or folding to one side.

Further, variable vents are formed at the sides to sufficiently absorbing shock after rapid unfolding, so that the variable vents open and the gas is discharged, when the internal pressure increases to a predetermined pressure or more. Further, common vents are formed toward the bumper to effectively absorb shock after the airbag cushion unfolds and to protect the vehicle on impact.

However, such an airbag cushion of the related art has a problem in that pressure is excessively concentrated on a specific chamber, so that the airbag may be broken, and the higher the hitting speed, the faster the internal pressure increases, to that it is difficult to deal with various hitting speeds with the existing venting structures in the actual situations.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an external airbag cushion for a vehicle which can effectively deal with hitting by forming an independent vent for each chamber and can effectively prevent damage of an airbag and a secondary injury by preventing a rapid increase in pressure even at a high vehicle speed or a high degree of hitting.

Various aspects of the present invention provide for an external airbag cushion for a vehicle which includes: an outer cover that inflates to cover the front of a bumper of a vehicle; a plurality of separation walls that are disposed inside outer cover to divide the inside into a plurality of chambers in the transverse direction of the vehicle; and low-pressure variable vents and high-pressure variable vents that are disposed for the chambers, respectively, and selectively open, depending on the internal pressure of the chambers.

Connection holes may be formed through the separation walls to reduce the difference in pressure among the chambers.

The outer cover may have an oblong inlet through Which gas flows inside, at the bumper side of a vehicle, a connecting portion that opens to all sides from the inlet, and a shock-absorbing portion that has a box shape extension from the connecting portion.

The low-pressure variable vents and the high-pressure variable vents may be positioned at the connection portions of the chambers.

For the leftmost and the rightmost chambers in the chambers, the low-pressure variable vent and the high-pressure variable vent may be positioned at the connection portions and the sides of the chambers.

Pairs of low-pressure variable vents and high-pressure vents may be provided for each chamber, facing each other.

The low-pressure variable vents and the high-pressure variable vents may be disposed up and down from the center line passing the inside of the outer cover.

The low-pressure variable vents and high-pressure vents may be alternately arranged at the chambers.

The low-pressure variable vents and the high-pressure variable vents may be disposed to be directed to the bumper of the vehicle when the outer cover inflates, and alternately arranged up and down from the center line passing the inside of the outer cover.

The low-pressure variable vents and the high-pressure variable vents may be discriminated in accordance with the materials of the vents or the forces fixing the vents.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
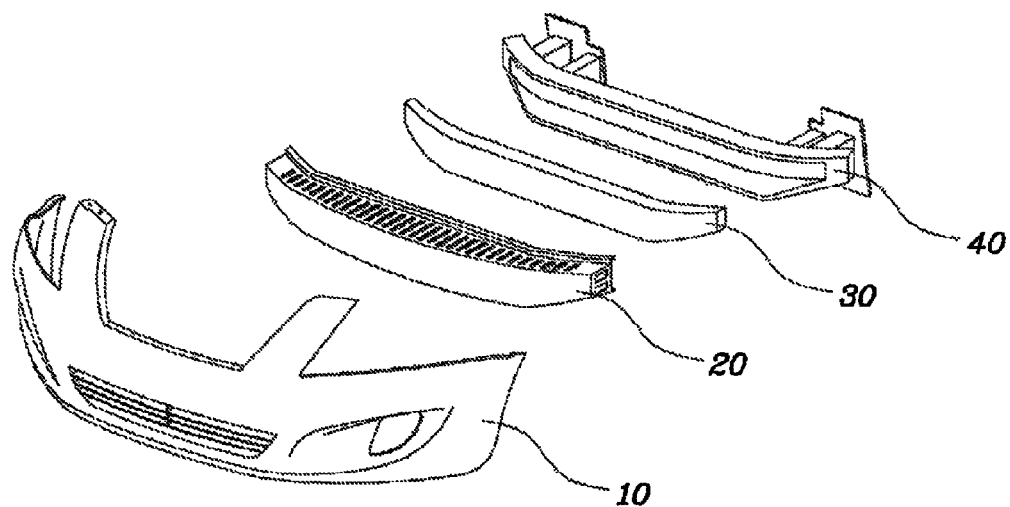
FIG. 1 is an exploded perspective view of an external airbag of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 3:
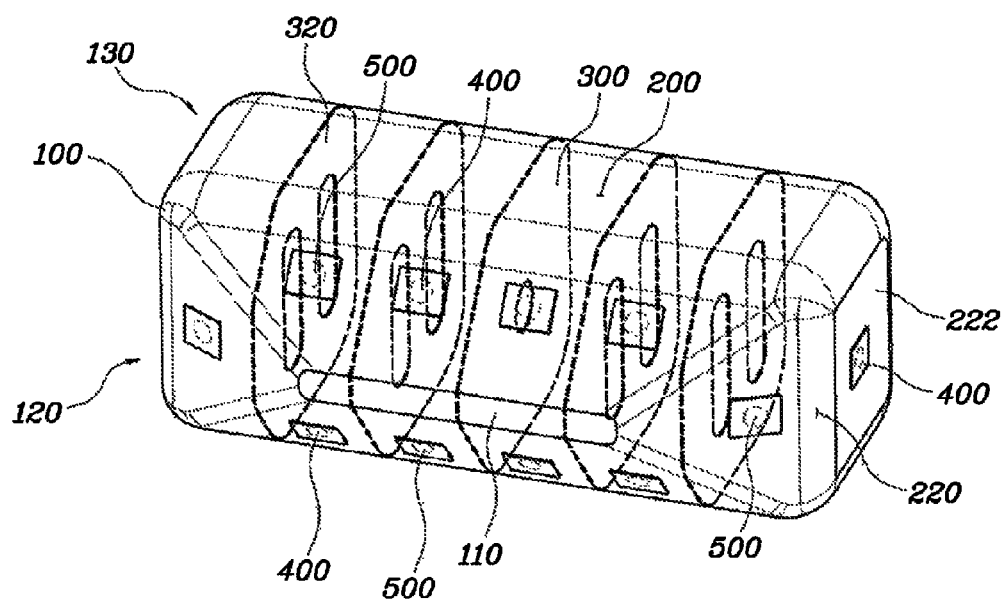
FIG. 3 is a view showing an exemplary external airbag cushion for a vehicle according to the present invention.

FIG. 3 is a view showing an external airbag cushion for a vehicle according to various embodiments of the present invention and the airbag cushion of the present invention includes: an outer cover 100 that inflates to cover the front of a bumper of a vehicle; a plurality of separation walls 300 that are disposed inside outer cover 100 to divide the inside into a plurality of chambers 200 in the transverse direction of the vehicle; and low-pressure variable vents 400 and high-pressure variable vents 500 that are disposed for the chambers 200, respectively, and selectively open, depending on the internal pressure of the chambers 200.

In detail, the external airbag is disposed inside the front of a bumper of a vehicle and inflates while a cushion is unfolded outward by explosion of an inflator.

For this operation, airbag cushion is implemented by one outer cover 100 and the plurality of separation walls 300 are vertically disposed at predetermined distances in parallel inside the outer cover to divide the outer cover 100 into the plurality of chambers 200 in the transverse direction of a vehicle, as shown in the figure. Therefore, the airbag is divided into chambers 200 and a predetermined internal pressure is set to each of the chambers 200, so that the chambers 200 each can effectively absorb shock regardless of the hitting angle.

In detail, connection holes 320 are formed through the separation walls 300 to reduce the difference in pressure among the chambers 200, so that the chambers share a gas.

Further, the outer cover 100 has an oblong inlet through which gas flows inside, at the bumper side of a vehicle, a connecting portion 120 that opens to all sides from the inlet 110, and a shock-absorbing portion 130 having a box shape extension from the connecting portion 120, so that the farther the outer cover from the vehicle, the greater the entire cross-sectional area becomes to protect the vehicle on impact.

The outer cover of the airbag cushion has low-pressure variable vents 400 and high-pressure variable vents 500 that selectively open in accordance with the internal pressure of the chambers 200, for the chambers 200, respectively, in order to ensure the initial unfolding force and absorb shock generated during a collision.

The variable vents are made of silicone or a material with a low melting point partially on the surface of the outer cover, so that the variable vents are melted when the chambers can be filled with a high-temperature and high-pressure gas to form vent holes or the vents are sewn and torn to vent holes are opened at a predetermined pressure or more, that is, a variety of variable vents can be implemented. The low-pressure variable vents 400 and the high-pressure variable vents 500 are provided to open at different time points, depending on the materials of the vents or the forces fixing the vents.

In detail, the low-pressure variable vents 400 open at a predetermined internal pressure or more, and the high-pressure variable vents 500 open when a higher internal pressure is reached. The internal pressure of the external airbag cushion can change in accordance with the speed or intensity of hitting, so it is possible to achieve the same shock-absorbing effect under a low pressure and a high pressure and to preclude a secondary injury due to a high pressure, by maintaining an appropriate internal pressure by opening only the low-pressure variable vents 400 in a low-speed hitting, and by maintaining an appropriate internal pressure by opening the high-pressure variable vents 500 too in a high-speed hitting.

Meanwhile, the low-pressure variable vents 400 and the high-pressure variable vents 500 are positioned at the connection portions 120 of the chambers 200.

Further, for the leftmost and the rightmost chambers 220 in the chambers 200, the low-pressure variable vent 400 and the high-pressure variable vent 500 are positioned at the connection portions 120 and the sides 222 of the chambers 220. This is because designing is difficult due to a little insufficient space for forming the vents at the leftmost and the rightmost chambers 220 the sides 222 do not come in direct contact with an object, so that the gas can be ejected. Further, this is because resistance due to the bumper of the vehicle is generated when the gas is ejected through the connecting portions 120, so that the gas can be easily ejected when the gas is additionally ejected through both sides.

Meanwhile, pairs of low-pressure variable vents 400 and high-pressure vents 500 are provided for each chamber 200, facing each other, so that all the vents are sequentially and symmetrically opened in the same direction without a rocking/rolling vibration.

Further, the low-pressure variable vents 400 and the high-pressure variable vents 500 are disposed up and down from the center line passing the inside of the outer cover 100, alternately at the chambers 200, so that vertical shaking is minimized.

That is, the low-pressure variable vents 400 and the high-pressure variable vents 500 are disposed to be directed to the bumper of the vehicle when the outer cover 100 inflates and alternately arranged up and down from the center line passing the inside of the outer cover 100, so that a rocking/rolling vibration can be prevented and vertical shaking is also prevented because the pressures discharged up and down are balanced; therefore, it is possible to absorb shock applied to the vehicle While stably maintaining the posture even when the gas is ejected.

Figure 2:
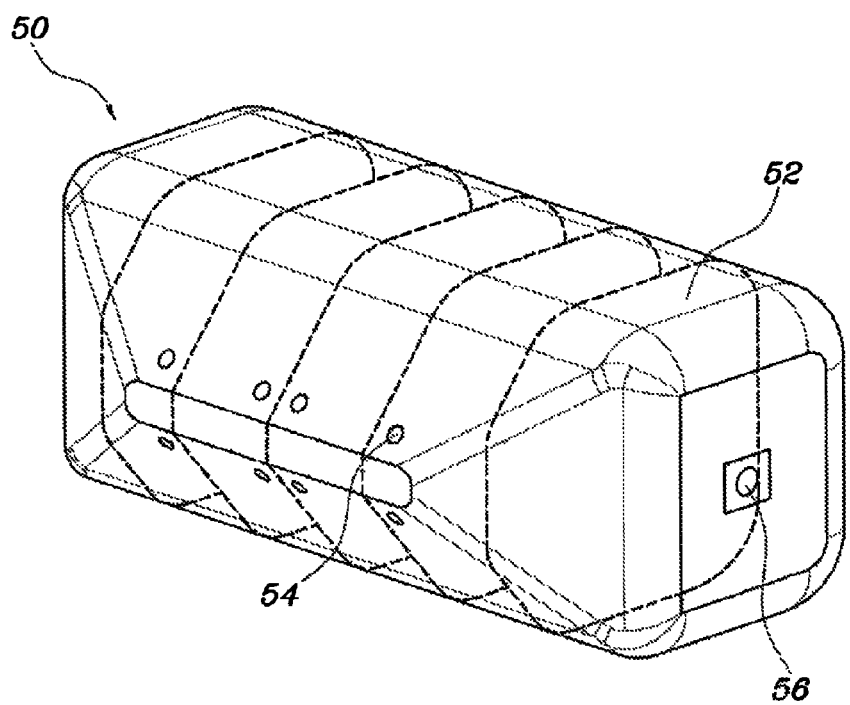
FIG. 2 is a view showing a cushion of an external airbag of the related art.
Figure 4:
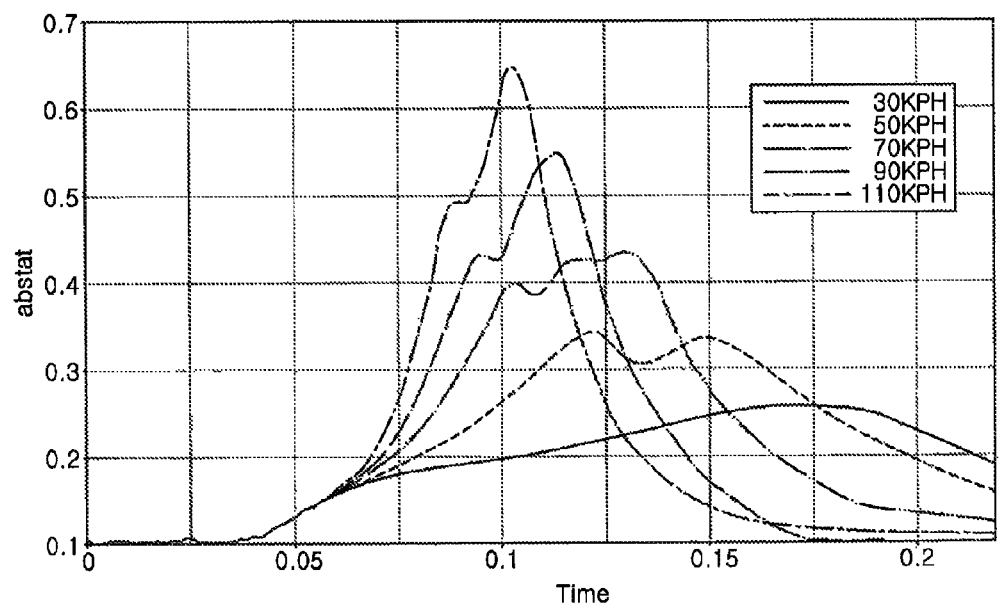
FIG. 4 is a graph showing an unfolding pressure of the external airbag cushion shown in FIG. 2.
Figure 5:
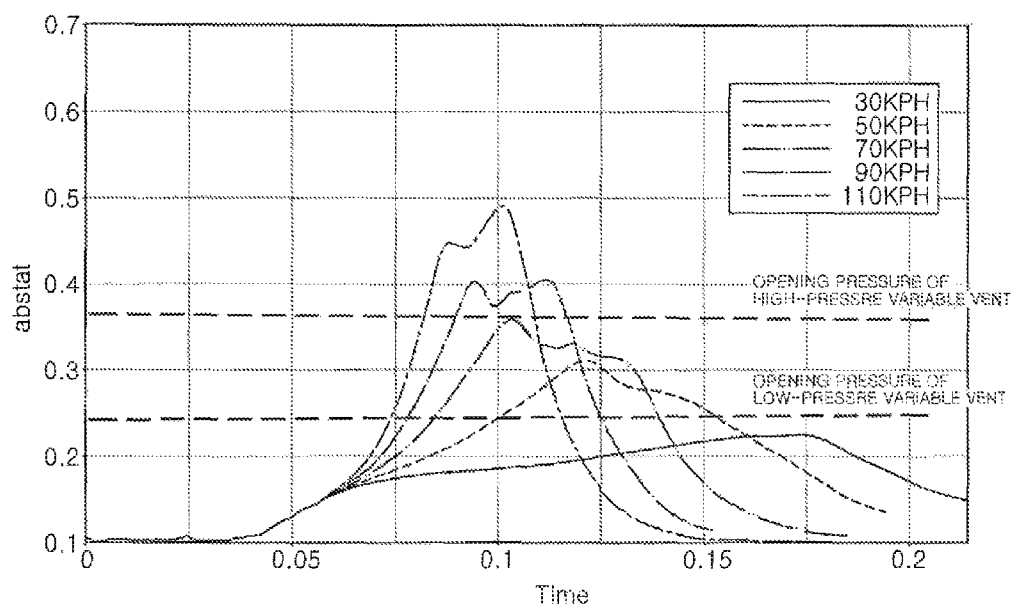
FIG. 5 is a graph showing an unfolding pressure of the external airbag cushion shown in FIG. 3.

Meanwhile, FIG. 4 is a graph illustrating an unfolding pressure of the external airbag cushion shown in FIG. 2, and FIG. 5 is a graph illustrating an unfolding pressure of the external airbag cushion shown in FIG. 3.

It can be seen from FIG. 4 that the higher the hitting speed, the greater the internal pressure of the airbag rapidly increased, so that the difference in the maximum pressure according to the speed became greater.

However, it can be seen from FIG. 5 that as the low-pressure variable vents and the high-pressure variable vents are sequentially opened, the internal pressure increased less rapidly even though the hitting speed increased, and the difference in the maximum pressure considerably decreased. This shows that it is possible to preclude a secondary injury and explosion of the cushion by preventing an excessive internal pressure of the airbag from being formed even if the hitting speed changes.

According to the external airbag cushion for a vehicle having the structure described above, it is possible to effectively deal with hitting by forming an independent vent for each chamber and can effectively prevent damage of an airbag and a secondary injury by preventing a rapid increase in pressure even at a high vehicle speed or a high degree of hitting.

Further, the airbag can rapidly unfold, because the vents do not operate in the earlier unfolding.

Further, since the vents are alternately arranged, the cushion is not shaken or biased, even if the vents operate.

For convenience in explanation and accurate definition in the appended claims, the terms front and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An external airbag cushion for a vehicle comprising:
   an outer cover that inflates to cover a forward portion of a bumper of a vehicle;
   a plurality of separation walls disposed inside the outer cover to divide the inside into a plurality of chambers in a transverse direction of the vehicle; and
   low-pressure variable vents and high-pressure variable vents that are included at each of the chambers, respectively, and selectively open, depending on an internal pressure of the chambers,
   wherein pairs of low-pressure variable vents and high-pressure vents are provided for each chamber, facing each other, and
   wherein the low-pressure variable vents and high-pressure vents are alternately arranged at the chambers.

2. The external airbag cushion of claim 1, wherein connection holes are formed through the separation walls to reduce the difference in pressure among the chambers.

3. The external airbag cushion of claim 1, wherein the outer cover has an oblong inlet through which gas flows inside, at the bumper side of a vehicle, a connecting portion that opens to all sides from the inlet, and a shock-absorbing portion including a box shape extension from the connecting portion.

4. The external airbag cushion of claim 3, wherein the low-pressure variable vents and the high-pressure variable vents are positioned at the connection portions of the chambers.

5. The external airbag cushion of claim 4, wherein for the leftmost and the rightmost chambers in the chambers, the low-pressure variable vent and the high-pressure variable vent are positioned at the connection portions and the sides of the chambers respectively.

6. The external airbag cushion of claim 1, wherein the low-pressure variable vents and the high-pressure variable vents are disposed up and down from the center line passing the inside of the outer cover.

7. The external airbag cushion of claim 1, wherein the low-pressure variable vents and the high-pressure variable vents are disposed to be directed to the bumper of the vehicle when the outer cover inflates, and alternately arranged up and down from the center line passing the inside of the outer cover.

8. The external airbag cushion of claim 1, wherein the low-pressure variable vents and the high-pressure variable vents are discriminated in accordance with the materials of the vents or the forces fixing the vents.

* * * * *